United States Patent Office 3,629,110
Patented Dec. 21, 1971

3,629,110
SOLID DIELECTRIC POLYOLEFIN COMPOSITIONS CONTAINING VOLTAGE STABILIZERS
George H. Hunt, West Newton, Mass., assignor to Simplex Wire and Cable Company, Cambridge, Mass.
No Drawing. Filed Oct. 2, 1968, Ser. No. 764,603
The portion of the term of the patent subsequent to May 19, 1986, has been disclaimed
Int. Cl. H01b 3/22
U.S. Cl. 252—63.2                                13 Claims

ABSTRACT OF THE DISCLOSURE

A solid dielectric composition is disclosed comprising a major amount of solid-phase polyolefin, e.g., polyethylene, polypropylene or polyisobutylene having dispersed therein a small, soluble voltage stabilizing amount from about 0.1 to about 10 percent of a voltage stabilizing additive. The voltage stabilizing additives include phthalic anhydride; benzoguanamine; triphenyl formazan; quinoline; isoquinoline; indene; indol and quinaldine, and mixtures thereof with other known voltage stabilizing additives to polyethylene, e.g., chlorinated aromatic hydrocarbons and other substituted aromatic hydrocarbons characterized by having an electron donor group and an electron acceptor group potentially hydrogen bonded together by a reversible proton, and mixtures thereof with m-dinitrobenzene; m-nitroaniline; p-nitroaniline; m-nitrotoluene; p-nitrotoluene; o-nitrochlorobenzene or p-nitrochlorobenzene.

BACKGROUND OF THE INVENTION (1) Field of the invention

This invention relates to electric insulating materials of great dielectric strength for use at high voltages such as on the order of kilovolts, and more particularly to polyolefin, e.g., polyethylene, solid dielectrics of improved voltage stability for use as insulation in power cables.

DESCRIPTION OF THE PRIOR ART

In the recent past, synthetic high-polymers have found increasing application as insulating materials in various electrical arts. In particular, olefin polymers, chiefly the polyethylenes and polypropylene, for example, are generally suitable as insulating materials for electric cables and wires due to their good mechanical properties and workability in conjunction with excellent electrical properties. For high-voltage purposes, however, the use of such substances has been possible only within narrow limits because their theoretical electrical breakdown strength in practice is not even approached.

It has been theorized that the relative weakness of commercially prepared polyolefin insulation results from the many flaws and air spaces formed during manufacture which are virtually impossible to prevent in commercial manufacturing processes. For example, small particles of foreign matter will always be present in the hydrocarbon matrix. Careful examination of many test failures has now revealed that these small flaws often initiate the growth of a fault in the insulation, with the actual growth of the fault, which results in failure, being due to electron avalanches derived from the current in the cable which produce ionization and subsequent failure at the flaw. A method of reducing the ability of foreign matter to initiate faults, i.e., a method to delay or prevent the occurrence of such electron avalanches, would obviously result in an overall increase in electrical breakdown strength.

In the copending application of Heidt, Ser. No. 732,486, filed May 7, 1968, now Pat. No. 3,522,183, it is disclosed that certain substituted aromatic compounds are operative to enhance the stability of polyolefins under high electrical stress. Typical of the additives disclosed by Heidt are o-nitrotoluene, 2-nitrodiphenylamine, o-nitroanisole, n-nitrosocarbazole and p-phenylazoanilene.

SUMMARY OF THE INVENTION

It has now been discovered that certain chemicals in addition to those disclosed by Heidt are voltage stabilizers in polyolefins and offer a considerable degree of protection from the effects of small imperfections in the insulation when added to the polyolefin, e.g., polyethylene, insulation. Effective voltage stabilizers in accordance with the present invention include such aromatic hydrocarbons as phthalic anhydride; benzoguanamine; triphenyl formazan; quinoline; isoquinoline; indene; indol; quinaldine; mixtures thereof; and mixtures thereof with one or more of 2,4,6-trinitrotoluene; 2-nitrodiphenylamine; 2,4-dinitrodiphenylamine; o-nitroanisole; 2,6-dinitrotoluene; 2,4-dinitrotoluene; o-nitrobiphenyl; 2-nitroaniline; anthranilonitrile; 1-fluoro-2-nitrobenzene; diparamethoxy diphenylamine; o-nitrotoluene; chloranil; 2,6-dinitroaniline; N-nitroso, N-phenyl, benzylamine; N-nitroso carbazole; N-nitrosodiphenylamine; azobenzene; 4-methyl-2-nitraniline; p-phenyl azoaniline; ω-nitro styrene; 2,2'-dinitrobiphenyl; diphenylamine; phenyl-alpha-naphthalamine; phenyl-beta-naphthalamine; N,N'-diphenyl paraphenylenediamine; benzidine; m-dinitrobenzene; m-nitroaniline; m-nitrotoluene; p-nitrotoluene; o-nitrochlorobenzene or p-nitrochlorobenzene.

The additives of the present invention are particularly effective with polyolefins such as low density polyethylene based compositions which generally have a density on the order of 0.92 to about 0.95 and a melt index between 0.2 and 2.0. Specifically, the polyethylene to which we refer are those solid polymers of ethylene prepared by the "high pressure" process. Hereinafter the invention will be described with reference to such polyethylene; however, the present invention is not to be considered as limited to use with such polyethylene since the additives are also effective for the desired purpose in high density (low pressure) polyethylenes and in other polyolefins, e.g., polypropylene, although the last material because of its lack of flexibility is not generally useful for cable insulation except as a mixture with polyethylene. The polyethylene compositions stabilized in accordance with the present invention can, of course, contain minor amounts of the usual additives, adjuvents and fillers conventionally employed in polyethylene compositions, such as carbon black, pigments, anti-oxidants, heat stabilizers and ozone resistance stabilizers. The additives of the present invention are also useful in increasing the voltage stability of polyethylene compositions over a long period of time where the polyethylene compositions contain minor amounts of rubbery polymers and copolymers of such olefins as isobutylene and isoprene. Additionally, the additives can be used with polyethylene compositions which have been cross-linked, using, for example, a peroxide catalyst, e.g., dicumyl peroxide, 2,5-bis(tertiary-butylperoxy) 2,5-dimethyl-2,5-di(tertiary-butylperoxy) hexyne-3, etc., or irradiation on the order of 10 to 15 megarads, for example, with cobalt-60 (gamma radiation) or a linear accelerator (beta radiation).

Since the proportion of the additives, i.e., voltage stabilizer compounds, required for significant improvement in voltage stability of polyethylene are generally from about 0.1 to about 10 percent, preferably about 0.2 to 5.0 percent, by weight based on the amount of polyethylene, an important criterion limiting the usefulness of a particular additive is its solubility in polyethylene which should be 0.1 percent by weight, and preferably 0.2 percent, or greater. Addition of such voltage stabilizer additives in excess of their solubility causes their crystallization in the polyethylenes with consequent weakening of the entire structure electrically by creating physical discontinuities, and is therefore to be avoided. The addition of 0.5 weight percent of additive to polyethylene based on the amount of polyethylene provides a particularly effective insulating composition for use in high voltage power cables.

It is also desirable that the additives be such that they can be incorporated in the polyethylene without decomposition of the polyethylene or volatilization of the voltage stabilizer additive. Since temperatures on the order of 300 to 400° F. are required for successful blending of polyethylenes with other materials, the voltage stabilizer additives should preferably be liquid and should have a low vapor pressure at this temperature range. Accordingly, the stabilizers should preferably have melting points below about 500° F. and boiling points above about 300° F. Of course, those additives which are non-viscous liquids at room temperatures can be added to the polyethylene by mere tumble mixing with, e.g., extrusion grade polyethylene granules.

The following examples serve to illustrate the increased voltage stability achieved with voltage stabilizers selected in accordance with the present invention without, however, limiting the same.

EXAMPLES 1-6

A number of tests, summarized in Table I, were made to ascertain the long time voltage stability at different voltages with polyethylene solid dielectric compositions employing a polyethylene base DFD 6506, a commercial polyethylene composition which contains a small amount of polypropylene (0.92 specific gravity, 0.25 melt index and including a trace of a commercial antioxidant, i.e., stearically hindered thiophenol). A series of eight samples were tested for each composition. The first series of samples tested were made of polyethylene DFD 6506 without a voltage stabilizing additive. The other compositions tested contain polyethylene and 2.0 percent by weight of a normally liquid voltage stabilizing additive. All samples containing additives were prepared by tumble mixing and were identical in size and shape.

Each of the samples was subjected at room temperature to a uniform alternating current voltage and examined for evidence of high voltage breakdown in accordance with the single needle test described in "An Accelerated Screening Test for Polyethylene High Voltage Insulation," AIEE Transactions Paper No. 62–54 (1962) by D. W. Kitchin and O. S. Pratt.

In this test a "standard defect" is used to determine the relative dielectric strength and to indicate the probable voltage life of the polyethylene insulation by inspection for "treeing," a characteristic generally accepted as an early stage of dielectric breakdown. The "standard defect" consists of a needle imbedded in a sample of polyethylene under controlled conditions. The blocks are then mounted so that the points of the needles are always the same distance from a ground plane electrode (2⅞ inches), and the sample is stressed by applying a voltage between the needle and ground for one hour. The sample is then inspected under a microscope at 25× for detectable "trees" as evidence of electrical failure.

The needle test has been shown to correlate well with the results of voltage life tests on wire. This is true of polyethylene with voltage stabilizing additives, as well as conventional polyethylene formulations.

TABLE I

| | | Number of failures in one hour out of eight samples at test voltage of— | | | | |
|---|---|---|---|---|---|---|
| | Additive | 10 kv. | 20 kv. | 30 kv. | 50 kv. | 60 kv. |
| Number: | | | | | | |
| 1 | None | 1 | 8,8 | | | |
| 2 | Quinoline | | | 0 | 0 | |
| 3 | Quinaldine | | | 0 | 2 | |
| 4 | Isoquinoline | | | 0 | 1 | 0 |
| 5 | Indene | | | 7 | | |
| 6 | Indol | | | 1 | 2 | |

EXAMPLES 7-13

The tests of Examples 1–6 were repeated using different (normally solid) voltage stabilizing additives and different polyethylene bases as summarized in Table II except that in the needle tests the distance between the ground plane electrode and the needle point was varied as indicated in Table II. Since the additives used in these examples are normally solid, they were mixed with the polyethylene base on a hot mill at a temperature between 325° and 400° F.

| Ex. No. | Polyethylene base material | Additive | Additive concentration[1] | Needle spacing, inches | Number of failures in one hour out of eight samples at test voltage of— | | | | | | |
|---|---|---|---|---|---|---|---|---|---|---|---|
| | | | | | 7 kv. | 10 kv. | 20 kv. | 30 kv. | 40 kv. | 50 kv. | 60 kv. | 70 kv. |
| 7 | N-172 | Blank | | 7½ | | | 6,7 | | | | | |
| 8 | N-121 | ----do---- | | 7½ | | | | 7,8 | | | | |
| 9 | V-103 | ----do---- | | 2⅞ | | 4 | | | | | | |
| 10 | N-172 | Phthalic anhydride | .25 | 7½ | | | | | 4,6 | 8 | | |
| 11 | N-172 | Benzoguanamine | .50 | 7½ | | | | | 6,8 | | | |
| 12 | N-121 | Triphenyl formazan | .25 | 7½ | | | | | 0,4 | 0 | | |
| 13 | V-103 | ----do---- | .25 | 2⅞ | | | 6 | 8 | | | | |

[1] Parts per 100 parts of base.

EXAMPLES 14-20

The test procedure of Examples 7–13 was repeated using samples in which mixtures of the voltage stabilizing additives were incorporated into the polyethylene base. The additive combinations used and the test results are summarized in Table III.

TABLE III

| Ex. No. | Polyethylene base material | Additives | Additive concentration[1] | Needle spacing, inches | Number of failures in one hour out of eight samples at test voltage of— | | | | | |
|---|---|---|---|---|---|---|---|---|---|---|
| | | | | | 7 kv. | 10 kv. | 20 kv. | 30 kv. | 40 kv. | 50 kv. | 60 kv. |
| 14 | N-172 | Benzoguanamine / 2,4-dinitrotoluene | .25 / .25 | 7½ | | | | | 0 | 0,2 | 8 |
| 15 | N-172 | Triphenyl formazan / 2,4-dinitrotoluene | .25 / .25 | 7½ | | | | | 0 | 0,1 | 6,7 |
| 16 | N-172 | Phthalic anhydride / Benzoguanamine | .25 / .25 | 7½ | | | | | | 2 | 8 |
| 17 | N-172 | Phthalic anhydride / 2,4-dinitrotoluene | .25 / .25 | 7½ | | | | | | 2 | 3,1 |
| 18 | N-172 | Phthalic anhydride / Diphenylamine | .25 / .25 | 7½ | | | | | | 0 | 0, 1,4 |
| 19 | N-172 | Benzoguanamine / Diphenylamine / 2,4-dinitrotoluene | .25 / .25 / .25 | 7½ | | | | | | 0 | 0, 0,4 |
| 20 | N-172 | Phthalic anhydride / 2,4-dinitrotoluene / Diphenylamine | .25 / .25 / .25 | 7½ | | | | | 0 | 0 | 0 |

[1] Parts per 100 parts of base.

In Tables II and III the polyethylene base material designated N–172 is commercial polyethylene DFDA 6506 as used in Examples 1–6 above. Polyethylene base material designated N–121 is a commercial polyethylene composition having a density of .92 and a melt index of .20 to .25. Polyethylene base material designated V–103 is a commercial curable polyethylene-peroxide mixture containing 2 to 3 percent of di(alpha-cumyl) peroxide.

The voltage stabilizing additives of this invention can be incorporated in the polyethylene as a blend with a highly aromatic hydrocarbon oil as described in my copending application Ser. No. 649,355, filed June 27, 1967, now Pat. No. 3,445,394. The additive is blended with the oil in amounts ranging from 5 to 50 parts by weight per 100 parts by weight of aromatic oil and the blend is added to the polyolefin in amounts ranging from 1 to 20 percent by weight based on the polyolefin. The addition of the additive to the polyolefin as a blend is particularly advantageous in using the normally solid additives which can be dissolved in the aromatic oil and added to the polyolefin by tumble mixing. Furthermore, when using the additives of my invention with cross-linked polyolefin compositions, it is desirable to add divinylbenzene to the polymer base as described in copending application of Learn and Hunt, Ser. No. 714,461, filed Mar. 20, 1968.

EXAMPLES 21–25

The test procedure of Examples 7–20 was repeated using samples in which the voltage stabilizing additives were blended with a highly aromatic oil and the blend incorporated into polyethylene base material, V–103, described above. The additive combinations used and the test results are summarized in Table IV. It will be noted that since the polyethylene base is a curable polyethylene-peroxide mixture, some sample compositions which included divinylbenzene were prepared and tested.

TABLE IV

| Ex. No. | Polyethylene base material | Additives | Additive concentration [1] | Needle spacing, inches | Number of failures in one hour out of eight samples at test voltage of— | | | | | | |
|---|---|---|---|---|---|---|---|---|---|---|---|
| | | | | | 7 kv. | 10 kv. | 20 kv. | 30 kv. | 40 kv. | 50 kv. | 60 kv. |
| 21 | V–103 | Benzoguanamine<br>2,4-dinitrotoluene<br>CD 101 [2] | .25<br>.25<br>2.0 | 2⅞ | | | | 4 | 5 | 7 | |
| 22 | V–103 | Benzoguanamine<br>2,4-dinitrotoluene<br>Divinyl benzene<br>CD 101 | .25<br>.25<br>2.0<br>2.0 | 2⅞ | | | | 2 | 2 | 8 | |
| 23 | V–103 | Triphenyl formazan<br>CD 101 | .25<br>2.0 | 2⅞ | | | | 3 | 8 | | |
| 24 | V–103 | Benzoguanamine<br>Orthonitrotoluene<br>CD 101 | .25<br>.25 | 2⅞ | | | | | 5 | | |
| 25 | V–103 | Benzoguanamine<br>Orthonitrotoluene<br>CD 101<br>Divinyl benzene | .25<br>.25<br>2.0<br>2.0 | 2⅞ | | | | | 4 | | |

[1] Parts per 100 parts of base.
[2] CD 101 is a highly aromatic oil having a specific gravity of 1.035, a pour point of 20° F., viscosity SUS of 100 at 100° F. and 36 at 210° F., a refractive index of 1.601 and an aniline point of less than 60° F. Its aromatic content is greater than 65 percent.

I claim:

1. A solid dielectric composition comprising a major amount of a polyolefin having dispersed therein a small, soluble, voltage stabilizing amount of a voltage stabilizing additive selected from the group consisting of phthalic anhydride; benzoguanamine; triphenyl formazan; quinoline; isoquinoline; indene; indol; and quinaldine.

2. The composition of claim 1 wherein the polyolefin is polyethylene.

3. The composition of claim 2 wherein the additive is phthalic anhydride.

4. The composition of claim 2 wherein the additive is benzoguanamine.

5. The composition of claim 2 wherein the additive is triphenyl formazan.

6. The composition of claim 2 wherein the additive is quinoline.

7. The composition of claim 2 wherein the additive is isoquinoline.

8. The composition of claim 2 wherein the additive is indene.

9. The composition of claim 2 wherein the additive is indol.

10. The composition of claim 2 wherein the additive is quinaldine.

11. The composition of claim 2 which further includes a second voltage stabilizing additive selected from the group consisting of chlorinated biphenyl; 4,4'-dibromobiphenyl; 9,10-dibromoanthracene; 4-bromobiphenyl; 4-iodobiphenyl; 2-chloronaphthalene; 2,4,6-trinitrotoluene; 2-nitrodiphenylamine; 2,4-dinitrodiphenylamine; o-nitroanisole; 2,6-dinitrotoluene; 2,4-dinitrotoluene; o-nitrobiphenyl; diphenylamine; 2-nitroaniline; anthranilonitrile; 1-fluoro-2-nitrobenzene; chloranil; 2,6-dinitroaniline; diparamethoxy diphenylamine; o-nitrotoluene; N-nitroso-N-phenyl-benzylamine; N-nitroso carbazole; p-nitrosodiphenylamine; N-nitrosodiphenylamine; azobenzene; 4-methyl-2-nitroaniline; p-phenyl azoaniline; ω-nitro styrene; 2,2' - dinitrobiphenyl; phenyl - alpha - naphthalene; phenyl-beta-naphthalene; N,N'-diphenyl, paraphenylenediamine; benzidine; and mixtures thereof with at least one of m-dinitrobenzene, m-nitroaniline, p-nitroaniline, m-nitrotoluene, p-nitrotoluene, o-nitrochlorobenzene, and p-nitrochlorobenzene.

12. The composition of claim 2 wherein the voltage stabilizing additive is present in an amount of from about 0.1 to about 10 percent by weight based upon the polyolefin.

13. The composition of claim 1 which further includes a highly aromatic hydrocarbon.

References Cited

UNITED STATES PATENTS

| | | | |
|---|---|---|---|
| 3,445,394 | 5/1969 | Hunt | 252—66 |
| 3,522,183 | 7/1970 | Heidt | 252—63.7 |
| 3,542,684 | 11/1970 | Hunt | 252—63.2 |

JOHN T. GOOLKASIAN, Primary Examiner

D. J. FRITSCH, Assistant Examiner

U.S. Cl. X.R.

174—110.44; 252—63.7, 66; 260—45.7 R, 45.9 R